United States Patent
Tiwari

(10) Patent No.: US 7,359,713 B1
(45) Date of Patent: Apr. 15, 2008

(54) BATTERY CONSUMPTION OPTIMIZATION FOR MOBILE USERS

(75) Inventor: Anil Tiwari, Palo Alto, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 192 days.

(21) Appl. No.: 10/377,563

(22) Filed: Feb. 28, 2003

(51) Int. Cl.
*H04Q 7/20* (2006.01)

(52) U.S. Cl. ............... 455/456.1; 455/456.6; 455/571; 455/572; 455/573; 455/574; 342/357.01; 342/105; 342/106; 342/113; 342/114

(58) Field of Classification Search .. 455/456.1–456.6, 455/571–574; 340/988; 342/357.01, 105, 342/106, 113, 114
See application file for complete search history.

(56) References Cited

U.S. PATENT DOCUMENTS

| | | | |
|---|---|---|---|
| 5,959,577 | A | 9/1999 | Fan et al. |
| 6,204,772 | B1 * | 3/2001 | DeMay et al. ......... 340/686.1 |
| 6,362,730 | B2 | 3/2002 | Razavi et al. |
| 6,408,196 | B2 * | 6/2002 | Sheynblat et al. ......... 455/574 |
| 6,810,325 | B2 * | 10/2004 | Amano et al. ............. 701/207 |
| 2001/0033225 | A1 | 10/2001 | Razavi et al. |
| 2001/0044312 | A1 * | 11/2001 | Yamane ...................... 455/456 |
| 2002/0002599 | A1 | 1/2002 | Arner et al. |
| 2002/0013815 | A1 | 1/2002 | Obradovich et al. |
| 2002/0042266 | A1 | 4/2002 | Heyward et al. |
| 2002/0065698 | A1 | 5/2002 | Schick et al. |
| 2002/0124065 | A1 | 9/2002 | Barritt et al. |
| 2002/0184200 | A1 | 12/2002 | Ueda et al. |
| 2003/0104849 | A1 * | 6/2003 | Arimitsu ...................... 455/574 |
| 2003/0115019 | A1 * | 6/2003 | Doddek et al. ............. 702/183 |
| 2003/0129995 | A1 * | 7/2003 | Niwa et al. ................. 455/456 |
| 2004/0014478 | A1 * | 1/2004 | Hoffman et al. ......... 455/456.1 |
| 2004/0204184 | A1 * | 10/2004 | Lin ............................ 455/574 |

FOREIGN PATENT DOCUMENTS

| | | |
|---|---|---|
| WO | PCT/US00/27749 | 4/2001 |
| WO | WO 01/26288 A1 | 4/2001 |
| WO | PCT/US01/19532 | 12/2001 |
| WO | WO 01/96906 A1 | 12/2001 |
| WO | PCT/US01/22686 | 2/2002 |
| WO | WO 02/10939 A1 | 2/2002 |

* cited by examiner

*Primary Examiner*—William Trost
*Assistant Examiner*—Julio Perez

(57) ABSTRACT

Systems and methods are disclosed to provide power management for a mobile communication device having a location determination function. The frequency of the location determination function may be adjusted based on whether the mobile communication device is moving and may be further adjusted based on battery voltage or expected battery life.

25 Claims, 3 Drawing Sheets

GPS Sample rate: Rate at which the application is asking GPS for location information
$V_{th1}$ : Batter voltage threshold where the phone has very limited charge left
$V_{th2}$ : Batter voltage threshold above which normal operation can take place

BATTERY CONSUMPTION OPTIMIZATION FOR MOBILE USERS

TECHNICAL FIELD

The present invention relates generally to communication systems and, more particularly, to systems and methods for providing power management for a mobile communication device.

BACKGROUND

Mobile communication devices are well known and are utilized by individuals and businesses to communicate various types of information. For example, mobile communication devices may include wireless telephones, personal digital assistants, or custom communication devices that can communicate via text and/or voice or other information over a wireless communication link. These mobile communication devices may also include location determination techniques, such as for example via their cellular network or by utilizing satellite signals (e.g., global positioning system (GPS) satellites).

The location determination technique that is incorporated into the mobile communication device allows for a variety of potential location-based applications. However, the mobile communication device usually has a limited amount of power available from its battery and frequent use of the location determination technique may quickly drain the battery. A conventional mobile communication device generally requires its user to monitor battery life and determine when to disable the location determination function to conserve battery life. This approach places the burden on the user and may result in poor power management. As a result, there is a need for systems and methods for providing power management for a mobile communication device utilizing a location determination technique.

SUMMARY

Systems and methods are disclosed herein to provide power management for a mobile communication device. For example, in accordance with one embodiment of the present invention, a state machine monitors the movement (e.g., position, velocity, etc.) of the mobile communication device and adjusts the frequency of a location determination function based on the monitored movement. A battery state may also be monitored to further adjust the frequency of the location determination function to maximize battery life.

More specifically, in accordance with one embodiment of the present invention, a mobile communication device includes a location determination system adapted to receive location information for the mobile communication device; a communication system adapted to communicate through a wireless network; a microprocessor coupled to the location determination system and the communication system; and a state machine adapted to determine whether the mobile communication device is in a stopped state or a moving state and control how often the location information is obtained by the location determination system based on whether the mobile communication device is in the stopped state or the moving state.

In accordance with another embodiment of the present invention, a mobile device includes a location determination system adapted to receive location information and determine a position of the mobile device; and a state machine coupled to the location determination system and adapted to monitor a state of the mobile device and control how often to determine the position of the mobile device.

In accordance with another embodiment of the present invention, a method of providing power management to a mobile device having a location determination function includes determining whether the mobile device is stationary or moving; and controlling how often the location determination function is performed based on whether the mobile device is stationary or moving.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

The preferred embodiments of the present invention and their advantages are best understood by referring to the detailed description that follows. It should be appreciated that like reference numerals are used to identify like elements illustrated in one or more of the figures.

DETAILED DESCRIPTION

Figure 1:
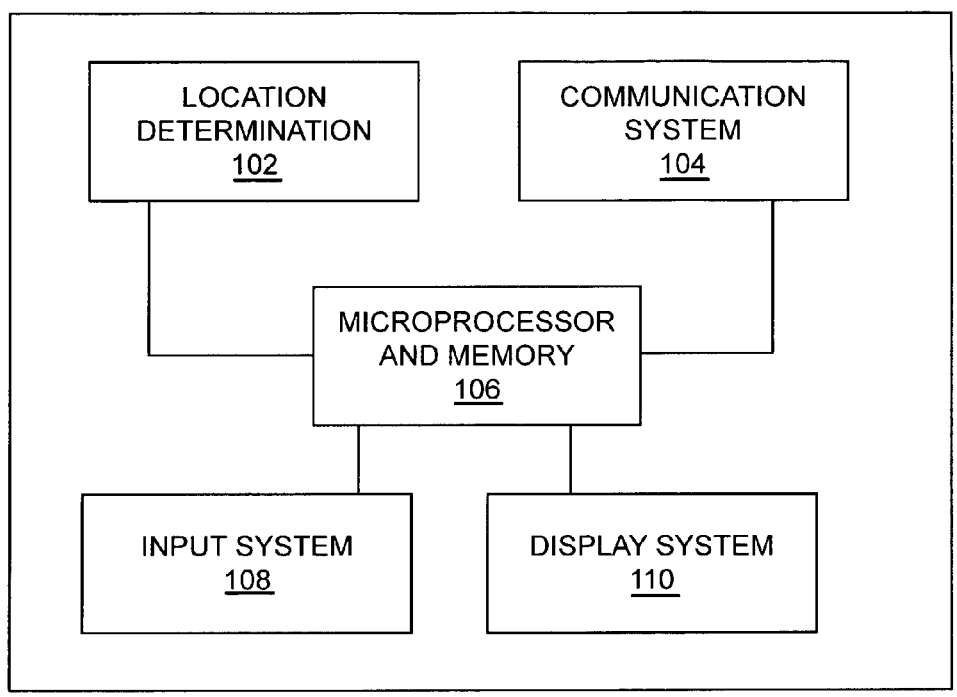
FIG. 1 shows a block diagram illustrating a mobile communication device in accordance with an embodiment of the present invention.

FIG. 1 shows a block diagram illustrating a mobile communication device 100 in accordance with an embodiment of the present invention. Mobile communication device 100 includes a location determination system 102, a communication system 104, a microprocessor and memory 106, an input system 108, and a display system 110.

Location determination system 102 provides a location function for mobile communication device 100. For example, location determination system 102 may receive global positioning system (GPS) signals and determine a pseudorange to one or more satellites in order to determine the location of mobile communication device 100 or provide the pseudoranges via communication system 104 to an external device that determines the location from the pseudoranges. In this example, location determination system 102 represents a GPS receiver that is integrated into mobile communication device 100.

Alternatively, location determination system 102 may resolve location information based on signals (e.g., cellular signals) or information received by communication system 104. Location determination system 102 may also resolve location, for example, by a combination of information received by communication system 104 (e.g., differential GPS information) along with information received through the GPS signals. However, generally, there must be specific circuitry or functions that may be periodically performed that could be selected or deselected, such that when deselected results in savings in terms of power usage (e.g., reduction in amount of battery power utilized).

Communication system 104 includes a transmitter and a receiver to communicate through a wireless network (e.g., a cellular network). Microprocessor and memory 106 include the core electronics that perform various desired functions and serve to link the various components of mobile communication device 100. Input system 108 represents a device for inputting information into mobile communication device 100. For example, input system 108 may represent a keyboard or a touchpad. Display system 110 is a display, such as a liquid crystal display or other type of display for presenting information to a user of mobile communication device 100.

Mobile communication device 100 may represent, for example, a wireless telephone (e.g., a cell phone), a two-way pager, a personal digital assistant, or other type of device that includes a location determination function (e.g., a GPS receiver) or is couplable to a location determination device. A typical example is a cell phone that incorporates a GPS receiver to provide the location determination function. Another example is a cell phone that provides the location determination function based on known cellular network techniques.

It should also be understood that various techniques discussed herein in accordance with an embodiment of the present invention may be applicable to a mobile device having solely a location determination function (i.e., communication system 104 is not present). For example, the battery consumption optimization techniques may be applicable to a mobile GPS receiver.

Figure 2:
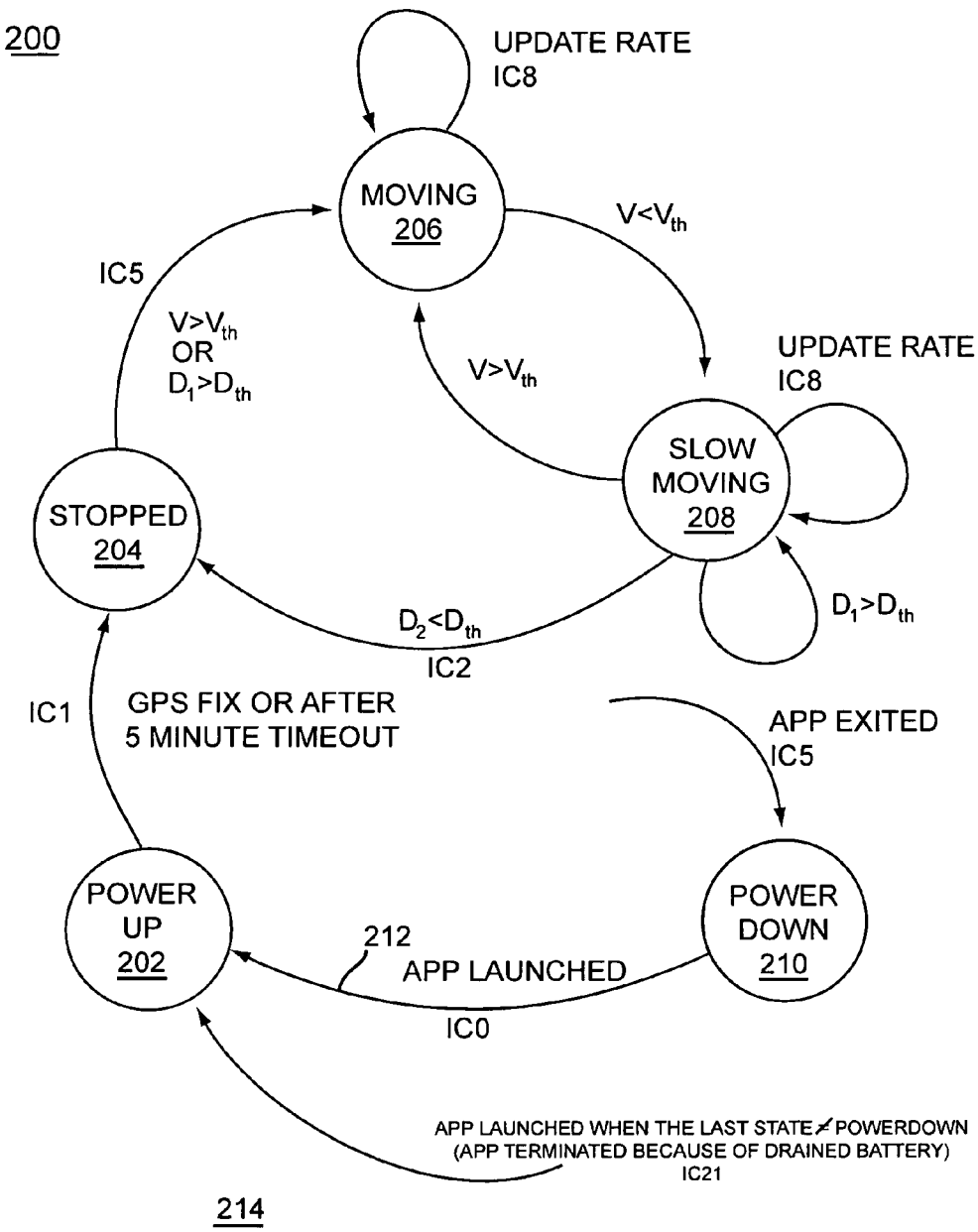
FIG. 2 shows a block diagram illustrating a state machine for a mobile communication device in accordance with an embodiment of the present invention.

FIG. 2 shows a block diagram illustrating a state machine 200 for mobile communication device 100 in accordance with an embodiment of the present invention. State machine 200 is a controller state diagram for monitoring the state of mobile communication device 100 and performing various functions based on the state. Specifically, state machine 200 has five states, which include a power up state 202, a stopped state 204, a moving state 206, a slow moving state 208, and a power down state 210.

Power up state 202 occurs when mobile communication device 100 is switched on (e.g., by a user to completely power up mobile communication device 100). Power up state 202 may be entered in a normal fashion, such as along a path 212 from power down state 210 (e.g., after a user switches off mobile communication device 100), or power up state 202 may be entered after shut down (along a path 214) due to some other condition, such as for example due to a completely drained battery. From power down state 210 to power up state 202 (path 212) or to power up state 202 along path 214, various software applications may be launched to provide or control various functions of mobile communication device 100.

Optionally, an event code (or referred to as an invoke code (IC)) may be generated, such as IC0 shown on path 212, which indicates that power has been applied to mobile communication device 100. The event code, for example, may be sent to a data processing station that monitors mobile communication device 100. If path 214 is taken to arrive at power up state 202, an event code (IC21) may be generated and possibly sent to the data processing station to indicate that an illegal or abnormal transition to power up state 202 has occurred. Further details regarding event codes, monitoring, and communications between a data processing station and a mobile communication device may be found, for example, in U.S. patent application Ser. No. 10/377,575 entitled "Dynamic Server Managed Profiles For Mobile Users" filed Feb. 28, 2003, which is incorporated herein by reference in its entirety.

After power up has completed, a transition from power up state 202 to stopped state 204 occurs. This transition may occur after a location determination has been made (e.g., a GPS fix) or after a certain time period has passed (e.g., a five minute timeout). Optionally, an event code (IC1) may be generated and sent to the data processing station to indicate a transition from power up to stopped has occurred.

During stopped state 204, moving state 206, and slow moving state 208, the location determination function (e.g., a GPS fix) is being performed at a certain frequency (i.e., a certain time interval or a certain rate) to obtain location and velocity information. The frequency of the location determination function may differ depending upon the state of mobile communication device 100.

For example, if mobile communication device 100 is in stopped state 204, the location determination function may be performed at a much lower frequency relative to when mobile communication device 100 is in slow moving state 208. Similarly, if mobile communication device 100 is in slow moving state 208, the location determination function may be performed at a lower frequency relative to when mobile communication device 100 is in moving state 206, because the location of mobile communication device 100 is changing at a slower rate.

By monitoring the state of mobile communication device 100 (e.g., stopped, slow moving, or moving), it can be determined how often a location determination should be performed to provide adequate tracking and monitoring of mobile communication device 100. Furthermore, by adjusting the frequency of the location determination function, battery power may be conserved by preventing unnecessary location determinations, such as when mobile communication device 100 is stopped or moving slowly.

Consequently, the location determination function may be performed, for example, at a first rate, a second rate, and a third rate, depending upon whether mobile communication device 100 is in stopped state 204, slow moving state 208, or moving state 206, respectively. As an example, the first rate, the second rate, and the third rate may be set to one minute, thirty seconds, and 5 seconds, respectively. Thus, if mobile communication device 100 is in stopped state 204, then for example a GPS fix will occur every minute. However, if mobile communication device 100 is in slow moving state 208 or moving state 206, then for example a GPS fix will occur every thirty seconds or every five seconds, respectively. Thus, by monitoring the states of mobile communication device 100, battery power may be conserved and needless location determinations may be avoided, while maintaining adequate tracking or location determination of mobile communication device 100.

It should be understood that more states may be added to further refine the amount of movement that each state covers. For example, another state may be added (e.g., fast moving) to more adequately cover the expected degree of movement. Alternatively, the number of states may be reduced, depending upon the application (e.g., allow only stopped and moving states). Furthermore, the frequency of the location determination function may be adjusted depending upon the intended application and the desired location determination accuracy.

As shown in FIG. 2, the transition from one state to the next may be determined based on a velocity of or a distance traveled by mobile communication device 100. For example, the transition from stopped state 204 to moving state 206 may occur if mobile communication device 100 has a velocity (V) greater than a threshold velocity ($V_{th}$). The threshold velocity, for example, may be set to 5 k/h (kilometers/hour). Alternatively, the transition from stopped state 204 to moving state 206 may occur if mobile communication device 100 has moved a distance ($D_1$), between the previously recorded stopped position and the current position, greater than a threshold distance ($D_{th}$). The threshold distance ($D_{th}$), for example, may be set to 100 m (meters). Optionally, an event code (IC5), as discussed above, may be generated and sent indicating the transition or marking, for example, a starting point from the stopped position.

If the velocity (V) drops below the threshold velocity ($V_{th}$), a transition from moving state 206 to slow moving state 208 occurs. Similarly, if the velocity (V) rises above the threshold velocity ($V_{th}$), a transition from slow moving state 208 to moving state 206 occurs.

The distance traveled may also be monitored while in slow moving state 208. If a distance ($D_2$) traveled over a certain time period (e.g., three minutes) is greater than the threshold distance ($D_{th}$), then mobile communication device 100 remains in slow moving state 208 (assuming velocity requirements discussed above are also met). If the distance ($D_2$) drops below the threshold distance ($D_{th}$), then a transition from slow moving state 208 to stopped state 204 occurs. Optionally, an event code (IC2), as discussed above, may be generated and sent indicating to the data processing station that a transition from slow moving to stopped has occurred.

It should be noted that the various parameters, such as the threshold distance ($D_{th}$), the threshold velocity ($V_{th}$), the distance ($D_1$), and the distance ($D_2$) may be set or adjusted by a user based on the intended application or expected conditions for mobile communication device 100. These parameters may also be set or modified, for example, solely by the data processing station, which communicates this information (e.g., within a profile) to mobile communication device 100 as described in U.S. patent application entitled "Dynamic Server Managed Profiles For Mobile Users" referenced herein.

During slow moving state 208, moving state 206, and possibly stopped state 204, the state of mobile communication device 100 may be communicated at a certain rate or at certain time intervals to the data processing station in a similar manner as when communicating the event codes. This is designated in an exemplary manner by an event code (IC8), which indicates an update to the data processing station, and labeled update rate for moving state 206 and slow moving state 208 in FIG. 2. The update rate or interval may be also set, for example, by a user or it may be set by the data processing station via the profile, as described in U.S. patent application entitled "Dynamic Server Managed Profiles For Mobile Users" referenced herein.

Power down state 210 may be entered, for example, when a user switches off mobile communication device 100. Various software applications, for example, that were launched upon entering power up state 202 may be exited and optionally an event code (IC6) may be generated to indicate the power down condition or event.

Figure 3:
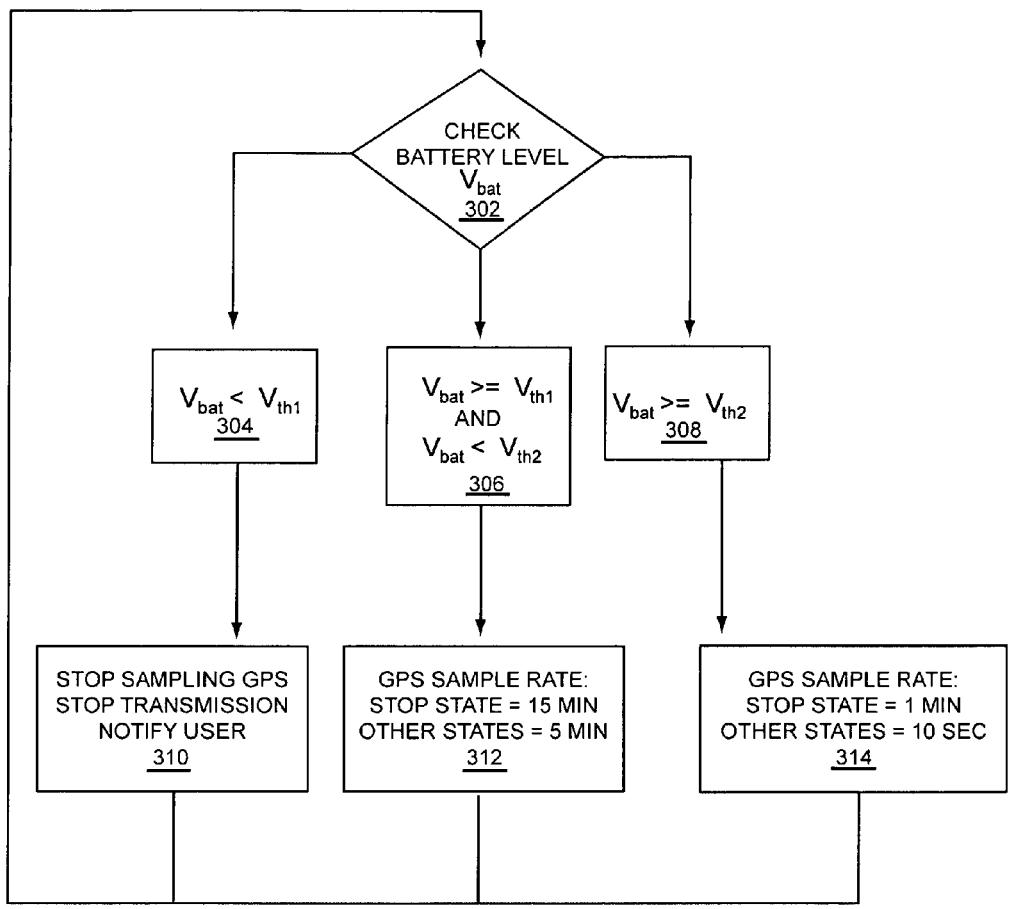
FIG. 3 shows a flowchart for battery consumption optimization in accordance with an embodiment of the present invention.

FIG. 3 shows a flowchart 300 for battery consumption optimization in accordance with an embodiment of the present invention. Flowchart 300 may be employed, for example, to complement state machine 200 (FIG. 2) to further adjust the location determination frequency based on measured or estimated battery supply strength (e.g., amount of charge left or battery voltage level or reserve). Alternatively, if state machine 200 is not employed, flowchart 300 may be used separately to adjust the location determination frequency based on battery supply strength. Flowchart 300 may be implemented in circuitry or software executed by a microprocessor (e.g., microprocessor and memory 106 of FIG. 1).

Step 302 checks or measures the battery voltage level ($V_{bat}$). Step 302 is performed periodically (e.g., every second). If the battery voltage level ($V_{bat}$) is less than a first threshold voltage ($V_{th1}$) at step 304, then step 310 prevents any further location determination attempts (e.g., GPS receiver location attempts are suspended or the GPS receiver is powered down). The first threshold voltage ($V_{th1}$) may, for example, be set to a value at which the battery has a very limited charge left or at which mobile communication device 100 has a very limited amount of operational time left. Additionally, the user of mobile communication device 100 may be notified of the low battery condition and transmissions regarding the location of mobile communication device 100 (e.g., to the data processing station) may also be terminated or prevented from occurring.

If the battery voltage level ($V_{bat}$) is greater than or equal to the first threshold voltage ($V_{th1}$) and the battery voltage level ($V_{bat}$) is less than the second threshold voltage ($V_{th2}$) at step 306, then step 312 modifies the location determination frequency (e.g., GPS sampling rate) to occur at a slower rate than when the battery has a full charge. The second threshold voltage ($V_{th2}$) may, for example, be set to a value at or above which normal operation can take place typically for a reasonable amount of time. The location determination frequency may, for example, be set to fifteen minutes when not moving (e.g., stopped state 204 in FIG. 2) or five minutes when moving (e.g., slow moving state 208 or moving state 206 in FIG. 2). These values may be adjusted based on battery capacity and intended application and the degree of location determination accuracy required.

If the battery voltage level ($V_{bat}$) is greater than or equal to the second threshold voltage ($V_{th2}$) at step 308, then step 314 sets the location determination frequency to occur at a desired rate for normal operation. The location determination frequency may, for example, be set to one minute when not moving or ten seconds when moving (e.g., slow moving state 208 or moving state 206 in FIG. 2). The threshold voltages may be set, for example, based on a certain voltage below a maximum voltage level (i.e., corresponding to a full battery charge) or based on a percentage from full charge. For example, the second threshold voltage ($V_{th2}$) may be set to one half (½ or 50%) of a full charge and the first threshold voltage ($V_{th1}$) may be set to one eighth (⅛ or 12.5%) of a full charge.

In accordance with an embodiment of the present invention, battery consumption is optimized based on movement of the mobile communication device and available battery power. In normal operation, the GPS application running on the mobile communication device queries the GPS hardware for a fix (i.e., location estimate) at a specified frequency (i.e., sampling rate or sampling interval, such as for example specified in a profile or by a user). If the mobile communication device is moving rapidly, the GPS fix must occur at relatively frequent intervals (e.g., every fifteen seconds) as opposed to when it is stopped (e.g., GPS fix every three minutes). The position, for example, may also be transmitted to the data processing station at a given frequency or time interval (reporting interval, e.g., every fifteen minutes).

Every time the GPS is queried for a position, a fix is attempted that uses energy and computation power. Therefore, if the mobile communication device is not moving rapidly or if the battery is low, there is no need for frequent location determinations (e.g., GPS fixes) and the sampling rate may be reduced to conserve power.

On the other hand and depending upon the location determination technique, if rapid movement occurs and the last GPS fix is stale, additional power may be required to acquire a fix because the last fix is not sufficient to guide its current acquisition attempt. For example, a cold start (completely new acquisition) may require more energy than a warm start (acquisition that utilizes recent acquisition data). Therefore, the location determination must be frequent enough to allow rapid acquisition.

In accordance with an embodiment of the present invention, a state machine (e.g., an intelligent state machine implemented in hardware or as a software application executed by a microprocessor) monitors the state of a mobile communication device (e.g., stopped, slow moving, moving, or fast moving) by utilizing location information. For example, location information may be provided by a GPS receiver integrated into the mobile communication device to provide position and velocity. The application then adapts the usage of GPS to optimize the life of the mobile communication device's battery based on the movement of the mobile communication device. The application (or another application) may further monitor the battery state and, if it is low, further reduce usage of GPS to maximize battery life or minimize battery usage.

Embodiments described above illustrate but do not limit the invention. It should also be understood that numerous modifications and variations are possible in accordance with the principles of the present invention. Accordingly, the scope of the invention is defined only by the following claims.

I claim:

1. A mobile communication device comprising:
    a communication system adapted to receive, over a wireless network, ranging signals for determining a geographical position of the mobile communication device;
    a location determination system coupled with the communication system, the location determination system adapted to receive the ranging signals and determine a geographical location of the mobile communication device;
    a battery coupled with the location determination system, the battery adapted to provide power to the mobile communication device; and
    a state machine coupled with the location determination system, the state machine adapted to (a) determine whether the mobile communication device is in a stopped state or a moving state based on a change in the geographical location of the mobile communication device, as determined by the location determination system; and (b) control a frequency at which the location determination system determines the geographical location based on (i) whether the mobile communication device is in the stopped state or the moving state and (ii) a level of charge stored in the battery, wherein the frequency comprises a first rate, a second rate, and a third rate of determining the geographical location.

2. The mobile communication device of claim 1, wherein the location determination system is a global positioning system receiver.

3. The mobile communication device of claim 1, wherein the communication device further comprises a microprocessor, and wherein the state machine is implemented in software executed by the microprocessor.

4. The mobile communication device of claim 3, wherein the microprocessor monitors the level of charge of the battery of the mobile communication device by measuring a voltage level of the battery.

5. The mobile communication device of claim 4, wherein the microprocessor prevents location information from being obtained by the location determination system when the voltage level of the battery is below a first voltage threshold, and the microprocessor reduces a frequency of obtaining the location information by the location determination system when the voltage level of the battery is at least equal to the first voltage threshold but below a second voltage threshold.

6. The mobile communication device of claim 3, further comprising:
    an input system coupled to the microprocessor and adapted to receive information from a user of the mobile communication device; and
    a display system coupled to the microprocessor and adapted to provide information to a user of the mobile communication device.

7. The mobile communication device of claim 1, wherein the state machine includes a stopped state, a slow moving state, and a moving state, the location information in the stopped state being obtained at a lower rate than for the slow moving state and the moving state.

8. The mobile communication device of claim 7, wherein the state machine further includes a power down state and a power up state.

9. The mobile communication device of claim 7, wherein a transition between the stopped state and the moving state is based on at least one of a velocity and a distance parameter, a transition between the moving state and the slow moving state is based on a velocity, and a transition between the slow moving state and the stopped state is based on a distance parameter.

10. The mobile communication device of claim 1, wherein the mobile communication device comprises a wireless telephone, a pager, or a personal digital assistant.

11. The mobile communication device of claim 1, wherein the wireless network is a cellular network.

12. The mobile communication device of claim 1, wherein the mobile communication device, over the wireless network, notifies a data processing station of at least one of a transition from the stopped state to the moving state and from the moving state to the stopped state.

13. The mobile communication device of claim 1, wherein at least one variable used by the state machine is provided by at least one of a user of the mobile communication device and a remote data processing station.

14. A mobile device comprising:
    a location determination system adapted to receive ranging signals and to determine a position of the mobile device based on the ranging signals;
    a battery coupled with the location determination system, the battery providing power to the location determination system; and
    a state machine coupled with the location determination system and adapted to (a) monitor (i) a state of the mobile device based on a change in position of the mobile device determined by the location determination system, and (ii) a level of charge in the battery; and (b) control a frequency at which the location determination system determines the position of the mobile device based on the state of the mobile device and the level of charge in the battery, wherein the frequency comprises a first rate, a second rate, and a third rate of determining the position.

15. The mobile device of claim 14, wherein the state of the mobile device includes a stopped state and a moving state, the position of the mobile device being determined at a slower rate in the stopped state compared to the moving state.

16. The mobile device of claim 14, wherein the location determination system comprises a global positioning system receiver having a microprocessor.

17. The mobile device of claim 16, wherein the microprocessor monitors the battery by sensing a voltage level of the battery.

18. The mobile device of claim 14, wherein the state of the mobile device comprises a stopped state and one or more moving states, with the states determined based on at least one of a velocity and a distance determined from the location information.

19. The mobile device of claim 14, wherein at least one variable used by the state machine is provided by at least one of a user of the mobile communication device and a remote data processing station, with the mobile device notifying the remote data processing station periodically of the state of the mobile device.

20. A method of providing power management to a mobile device having a location determination function, the method comprising:
    determining whether the mobile device is stationary or moving based on a change in geographical location determined by the location determination function from ranging signals received by the mobile device;
    determining a level of charge stored in a battery which supplies power to the mobile device; and
    controlling a frequency at which the location determination function is performed based on (i) whether the mobile device is stationary or moving, and (ii) based on the level of charge in the battery, wherein the frequency comprises a first rate, a second rate, and a third rate of performing.

21. The method of claim 20, wherein the controlling reduces a rate at which the location determination function is performed if the mobile device is stationary relative to when the mobile device is moving.

22. The method of claim 20, wherein the level of charge in the battery is determined by measuring a battery voltage level and wherein the method further comprising reducing a rate at which the location determination function is performed if the battery voltage level drops below a first voltage threshold.

23. The method of claim 17, further comprising preventing the location determination function from being performed if the battery voltage level drops below a second voltage threshold.

24. The method of claim 20, wherein the determining of whether the mobile device is stationary or moving is based upon at least one of a distance and a velocity calculated from the location information.

25. The method of claim 20, wherein a variable used in at least one of the determining and the controlling is provided by at least one of a user of the mobile device and a data processing station.

* * * * *